United States Patent [19]

Deckers

[11] Patent Number: 4,480,591

[45] Date of Patent: Nov. 6, 1984

[54] CONDENSING BOILER

[75] Inventor: Jan H. Deckers, Tegelen, Netherlands

[73] Assignee: Beondu A.G., Vaduz, Liechtenstein

[21] Appl. No.: 463,127

[22] Filed: Feb. 2, 1983

[30] Foreign Application Priority Data

Feb. 2, 1982 [NL] Netherlands ........................ 8200384

[51] Int. Cl.³ .............................................. F22B 7/00
[52] U.S. Cl. ...................................... 122/14; 122/17; 122/20 B; 237/55
[58] Field of Search ................... 122/20 B, 13 R, 421, 122/14–19; 237/55; 165/DIG. 2

[56] References Cited

U.S. PATENT DOCUMENTS

| | | | |
|---|---|---|---|
| 1,948,064 | 2/1934 | Cartter | 122/17 |
| 1,961,231 | 6/1934 | Maier | 122/17 |
| 3,944,136 | 3/1976 | Huie | 237/55 |
| 4,227,647 | 10/1980 | Eriksson | 237/55 |
| 4,356,794 | 11/1982 | Bouman et al. | 122/14 |

FOREIGN PATENT DOCUMENTS

| | | |
|---|---|---|
| 2846 | 10/1980 | European Pat. Off. |
| 2485171 | 8/1980 | France |
| 7206921 | 11/1973 | Netherlands |
| 7317338 | 6/1974 | Netherlands |

Primary Examiner—Henry C. Yuen
Attorney, Agent, or Firm—Fleit, Jacobson, Cohn & Price

[57] ABSTRACT

A hot water boiler, in particular a light metal central heating boiler, having a combustion chamber and a burned gases flue above the chamber, both the chamber and the flue having a common separating wall with a common water passage, the lower part of the flue, joining the upper part of the combustion chamber, being provided with extensions from the wall for increasing the heat exchange surface thereof and providing a first heat exchanger for the burned gases, the upper part of the flue being provided with inclined ribs extending from the wall to increase the heat exchange surface thereof and forming a second, condensing heat exchanger, the ribs forming condensate collectors cooperating with condensate drains.

7 Claims, 6 Drawing Figures

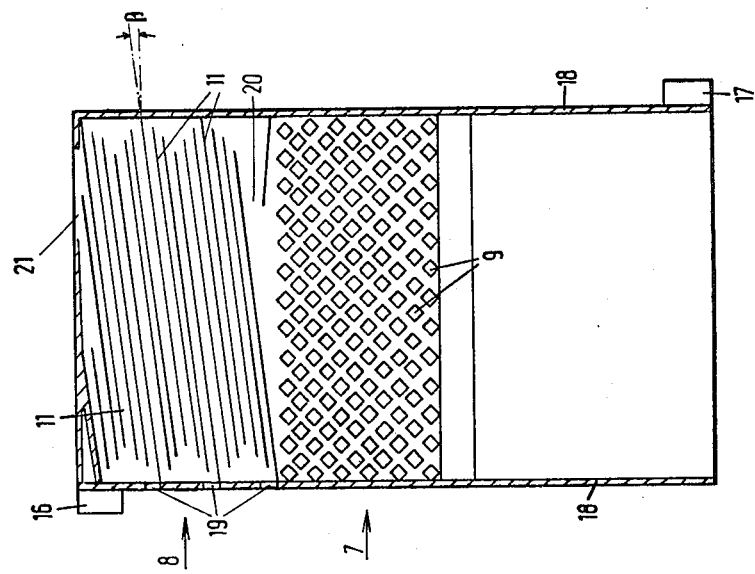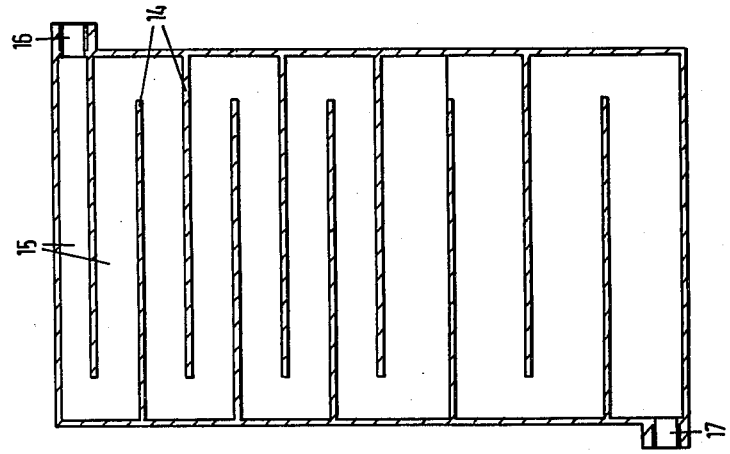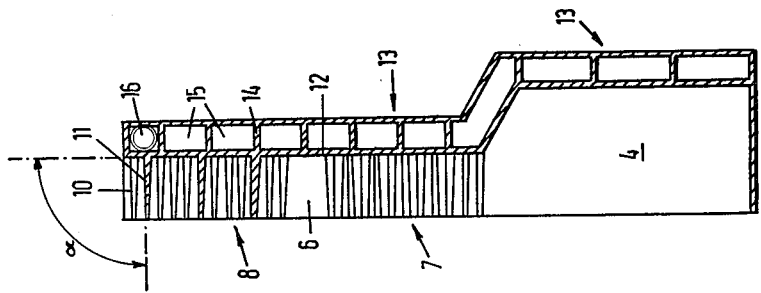

CONDENSING BOILER

This invention relates to a boiler, in particular a central heating boiler, which is designed to be made by casting, from light metal, and comprising a combustion chamber passing at the top into a flue separated by a wall from a water passage, the portion of the flue situated directly above the combustion chamber being designed as a primary heat exchanger having extensions extending from the wall into the flue and enlarging the heated surface and the upper end of the primary heat exchanger being connected to a secondary heat exchanger likewise fitted with extensions enlarging the heated surface and wherein the flue gas temperature can be reduced to the extent that moisture contained therein is condensed and condensate discharge means being provided, and wherein the same water passage forms part of both the primary and secondary heat exchanger.

The advantage of the condensation of moisture from the flue gases leaving the primary heat exchanger is that the heating value of the fuel gas is optimally used, since also the heat of condensation, which may be about 20% of the heating value, of natural gas and which otherwise disappears via the chimney, is utilized for heating water and hence for space heating.

In the published European patent application No. 0028046 there is described a condensing boiler composed of two hollow castings, the cavities of which form part of the water passage, whose facing sides enclose the combustion chamber with above it the primary heat exchanger, and whose outwardly oriented sides form parts of a secondary heat exchanger. At the bottom of the boiler there is provided a condensate sump and the cold flue gases are discharged by a blower. The cooling water is supplied to the bottom of the boiler and, flowing upwards, has first to simultaneously withdraw heat from the primary heat exchanger and from the secondary heat exchanger, while the water also flows along the wall of the combustion chamber. It is clear that the condensate formation in the known boiler is difficult to control.

It is an object of the invention to provide a boiler which avoids this drawback.

To this effect, according to the invention, the condensing secondary heat exchanger is provided directly above and contiguous with the primary heat exchanger in the same flue, while the extensions of the secondary heat exchanger enlarging the heated surface project from the same wall as the extensions of the primary heat exchanger. Since, in the boiler according to the invention, the water, introduced in the top of the boiler, flows successively along the secondary heat exchanger, the primary heat exchanger and the combustion chamber, with downwardly increasing water temperature, a selective heat exchange with condensate formation at the lowest water temperature level, and hence optimal condensate formation, are possible.

In a further embodiment of the invention, the boiler has a secondary heat exchanger fitted with extensions enlarging the heated surface in the form of plates defining one or more labyrinth paths for the flue gas and oriented substantially transversely to the rising stream of flue gases, and according to the invention at least some of said plates are designed as condensate collectors and drains. It is clear that such a design means a substantial constructive simplification relative to the known condensing heat exchanger, so that not only manufacture but also maintenance can be less expensive.

For conducting condensate formed the condensate collectors and drains may be fitted with upright edges and like condensate guides, but a structurally simple and moreover favourable solution as far as casting technique is concerned is that in which according to the invention, at least the plates designed as condensate collectors and drains enclose at their top an angle smaller than 90° with the wall from which they project. The plates together with the cooled wall from which they project then form a collector and drain for condensate wherein the condensate is conducted close to the cooled wall, so that there is no risk of evaporation of the condensate already formed.

Furthermore, the plates may be inclined laterally and a condensate drain connection may be provided at a lowest point, thus effectively preventing condensate once formed from falling back on the primary heat exchanger.

For a better cooling of the flue gas labyrinth paths, finger-shaped projections may be provided in the spaces between successive plates in the secondary heat exchanger.

According to the invention, a labyrinth path may be formed in the water passage by horizontal partitions, said path having a cold water inlet at the top and a hot water outlet at the bottom, while in the zone of the secondary heat exchanger where condensation is to take place preferably, the plates designed as condensate collectors and drains lie as much as possible directly opposite water labyrinth paths.

By having the relatively cold water first pass the secondary heat exchanger and subsequently the primary heat exchanger, the temperature in the secondary heat exchanger can be reduced to the extent that condensation is initiated. This condensation should preferably not occur in the lowerregions of the secondary heat exchanger, since it is possible here that formed condensate falls back on the primary heat exchanger. In order to promote that condensation occurs in a selected zone of the secondary heat exchanger, e.g. its central zone, it is ensured that in this zone the condensate collector and drain plates are optimally cooled, which is achieved by cooling the back of the wall portion from which said plates project directly with flowing water.

In the boiler according to the invention the water passage already forming part of the primary and the secondary heat exchanger can continue at the bottom of the primary heat exchanger as a water jacket bounding the combustion chamber for heating the flowing water by radiant heat.

According to the invention, the combustion chamber, the two heat exchangers and the water passages can form with two sidewalls a single casting, which from the viewpoint of production technique, means a simplification and which is favourable from a constructive viewpoint as well. Two of such units can be combined to one boiler body, with the open sides facing each other.

It is also possible, however, in particular in order to design the boiler as a wall boiler, to shut off the open side of the casting with a hollow cover wall designed as a primary air supply having an inlet at the top and an outlet at the bottom. Thus, the primary combustion air is preheated in the path through the cover countercurrently with the stream of flue gases. In this optimal embodiment, the boiler according to the invention can be manufactured with a light weight for a capacity of 8-16 kW.

Some embodiments of the boiler according to the invention will now be described, by way of example, with reference to the accompanying drawings, in which:

FIG. 3 is a cross-section on the line III—III of FIG. 1;

FIG. 4 is a cross-section on the line IV—IV of FIG. 2;

FIG. 6 is a view similar to FIG. 2 of a variant embodiment of the boiler.

Figures 1, 2:
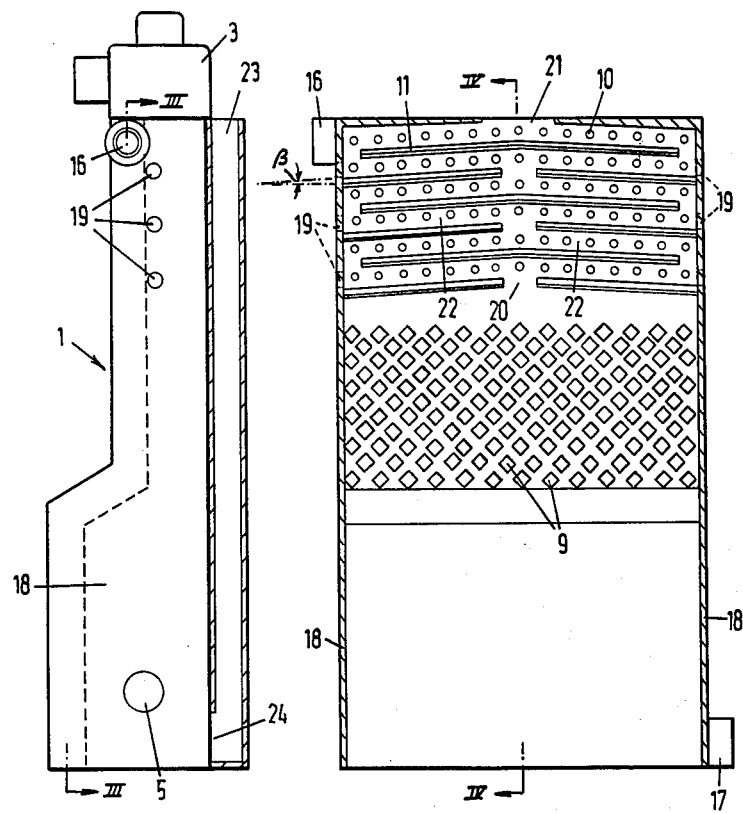
FIG. 1 is side view of the boiler.
FIG. 2 is a front view of the boiler shown in FIG. 1 with the cover removed.
Figure 5:
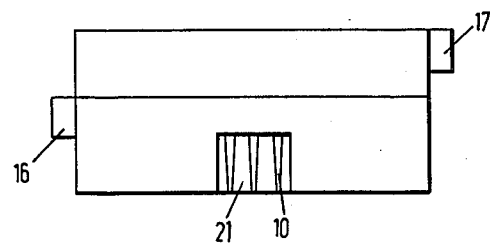
FIG. 5 is a top view of the boiler with the blower removed.

According to the drawing (FIGS. 1–5), the boiler comprises a casting 1 closable with a cover 2 and on which a blower 3 for flue gas discharge can be mounted. The boiler is applied in practice in a heat insulating jacket not shown in the drawing.

The casting 1 defines a combustion chamber 4. FIG. 1 shows an inlet 5 for a burner. The combustion chamber 4 passes at the top into a flue 6, wherein a primary heat exchanger 7 and a secondary heat exchanger 8 are formed by prismatic extensions 9 enlarging the heat exchanging surface in the primary heat exchanger 7, and an assembly of finger-shaped extensions 10 and extensions 11 in the form of plates in the secondary heat exchanger 8.

All extensions 9, 10 and 11 extend from a flue wall 12 forming the partition from a water passage 13 extending behind the heat exchangers 7 and 8, wherein (see FIG. 3) labyrinth paths 15 are defined by means of partitions 14. The water passage has a cold-water inlet 16 and a hot-water outlet 17, both formed in sidewalls 18 of the casting 1. Preferably, the water passage 13 has an extension at the bottom of the primary heat exchanger 7, forming a water jacket 13', bounding the combustion chamber 4.

In the secondary heat exchanger 8 the platelike extensions are disposed at an angle $\alpha$ of less than 90° to the wall 12. Moreover, they are inclined from the centre of the boiler laterally at an angle $\beta$, with the plates 11 terminating alternately short of the sidewalls 18 and in contact with the sidewalls 18. Directly above the locations where plates 11 link up with the sidewalls 18, there are formed condensate drain connections 19.

The plates 11 in the secondary heat exchanger 8 define a flue gas labyrinth path having an inlet 20 centrally above the primary heat exchanger 7 and a flue gas outlet 21 connected to a blower 3 (see FIG. 1).

The partitions 14 and the labyrinth paths 15 in the water passage 13 are positioned at the level of the secondary heat exchanger relative to the flue gas passages 22 in such a way that in the zone of the secondary heat exchanger 8, where condensation of moisture present in the flue gas is to take place preferably, the plates 11 at the back of the wall 12 serving as condensate collectors and drains are as much as possible cooled directly by water flowing in the water labyrinth paths 15.

The condensation zone in the secondary heat exchanger 8 is preferably the central zone of said exchanger, for the lower portion of the secondary heat exchanger, directly above the primary heat exchanger 7, is less suitable for the purpose, since the risk of condensate falling back on the primary heat exchanger is present in this zone. The upper zone is not ideal either, since there is a great chance that the condensation herein is not complete and hence that condensate is discharged via the chimney.

Nevertheless, the drawings show drain connections 19 in all places where condensate could be formed.

A boiler can be assembled from two casting 1 by placing the castings with the open sides against one another and by welding them together.

However, it is possible to use one casting for a boiler which when designed as a wall boiler, may already have a large capacity. The open side of the casting 1, opposite the wall 12, can then be shut off by a cover wall 2 (see FIG. 1) which is hollow, having an inlet 23 and an outlet 24 which terminates in the combustion chamber 4. The cover 2 mav then serve as a suoplv duct for primary combustion air which then is supplied countercurrently with the rising flue gases and is preheated in the path in the cover 2 by the rising flue gases.

The embodiment shown in FIG. 6 is distinct from that according to FIGS. 1–5 by the pattern of the plates 11 in the secondary heat exchanger 8.

It will be clear that the invention is not limited to the embodiments shown. Essential for the invention are that the secondary heat exchanger is disposed in the same flue directly above the primary heat exchanger and the possibility of manufacturing the combination of combustion chamber 4, primary heat exchanger 7, secondary heat exchanger 8 and water passage 13 as one casting.

I claim:

1. A central-heating boiler made by casting of light metal, said boiler comprising:

a casting having exterior walls;

a flue positioned in said casting for the passage of flue gas;

a combustion chamber positioned in said casting, said combustion chamber passing into said flue at the top of said combustion chamber;

a water passage defined by said casting for cooling water to be heated;

a wall of said casting separating both said flue and said combustion chamber from said water passage, said water passage directing water in an opposite direction to the flow of said flue gas through said flue;

a primary heat exchanger disposed in said flue directly above and contiguous with said combustion chamber;

first extensions for enlarging a heated surface of said flue, said first extensions extending from said wall separating said water passage from said flue, said first extensions extending into said flue in said primary heat exchanger for absorbing heat from said flue gas, said flue gas rising generally vertically from said combustion chamber to said primary heat exchanger;

a secondary heat exchanger disposed in said flue directly above and contiguous with said primary heat exchanger;

second extensions for enlarging the heated surface of said flue, said second extensions extending from said wall separating said water passage from said flue, said second extensions extending into said flue in said secondary heat exchanger, said second extensions define at least one labyrinth path for said flue gas, said flue gas rising generally vertically from said primary heat exchanger to said secondary heat exchanger; and condensate discharge means defined by said exterior walls in said secondary heat exchanger for discharging moisture condensed from said flue gas through said exterior walls, the moisture being condensed from said flue gas by being exposed to said second extensions extending into said secondary heat exchanger and said second extensions reducing the temperature of said flue gas to the extent that moisture contained therein is condensed and collected one said second extensions until the condensed moisture flows to said condensate discharge means.

2. A boiler according to claim 1, wherein the secondary heat exchanger is fitted with said second extensions enlarging the heated surface of said flue in the form of plates defining at least one labyrinth path for the flue gas and oriented substantially transversely to the rising stream of flue gases, at least some of said plates form transversely inclined condensate collecting and draining gutters.

3. A boiler according to claim 2, characterized in that at least said condensate collecting and draining gutters are inclined towards said wall from which they extend at an angle of less than 90°.

4. A boiler according to claim 2, characterized in that the plates are inclined laterally and a condensate drain connection between said condensate discharge means and said plates is disposed at a lowest point of the plates.

5. A boiler according to claim 2, characterized in that at least some of said second extensions are finger-shaped and are provided in spaces between successive plates of said secondary heat exchanger.

6. A boiler according to claim 2, characterized in that a labyrinth path is formed by horizontal partitions in the water passage, said path having a cold water inlet at the top and a hot water outlet at the bottom, and in the secondary heat exchanger where condensation takes place, the condensate collecting and draining gutters lie along said wall, at least in part, directly opposite water labyrinth paths.

7. A boiler according to claim 1, characterized in that the casting is closed with a hollow cover wall for a primary air supply, said hollow cover wall having an inlet at the top of said secondary heat exchanger and an outlet terminating in the combustion chamber.

* * * * *